Nov. 25, 1924.

P. J. DONAVAN 1,517,106

BRAKE TESTING MACHINE

Filed Dec. 10, 1923

Inventor
Paul J. Donavan.
By A. J. O'Brien
Attorney

Patented Nov. 25, 1924.

1,517,106

UNITED STATES PATENT OFFICE.

PAUL J. DONAVAN, OF CLEVELAND, OHIO, ASSIGNOR TO HENRIETTA H. DONAVAN.

BRAKE-TESTING MACHINE.

Application filed December 10, 1923. Serial No. 679,549.

REISSUED

*To all whom it may concern:*

Be it known that I, PAUL J. DONAVAN, a citizen of the United States, residing at Cleveland, county of Cuyahoga, and State of Ohio, have invented certain new and useful Improvements in Brake-Testing Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an apparatus to be employed in the testing of automobile brakes.

The importance of automobile brakes is well recognized, as it is evident that without effective brakes, automobile driving becomes an extremely hazardous occupation, and yet it is a notorious fact that a large percentage of the automobiles in use today have brakes that are defective to a greater or less extent. One reason why so many brakes are defective is that there has been no reliable and convenient way of testing them, with the result that the driver remains in ignorance concerning their effectiveness until an emergency arises when he discovers, often too late, that his brakes were not in proper operative condition.

It is the object of this invention to produce a testing apparatus, by means of which the effectiveness of the brakes can be readily determined at any time. This apparatus, when installed at service stations, can be used for a variety of uses besides that of brake testing, some of which will be pointed out as the description proceeds.

My invention, briefly described, consists of two pairs of rollers so placed that each pair will receive one of the rear wheels of an automobile. Each roller has a gear wheel secured to one end and the gears of each pair mesh with a common drive pinion in such a manner that the rollers are rotated in the same direction. The drive pinions are secured to the ends of drive shafts, which correspond to the rear axle drive shafts of an automobile and may be capable of differential rotation. A motor, either gas or electric, is arranged to supply power for the rotation of the rollers. A dynamometer device is incorporated between the driving motor and the rollers for the measurement or comparison of the power expanded under different conditions of operation.

In order better and more clearly to describe my invention, I shall have reference to the accompanying drawing in which one embodiment thereof is shown, and in which.

The same reference numbers will be used to designate the same or similar parts throughout the several views.

Figure 1:
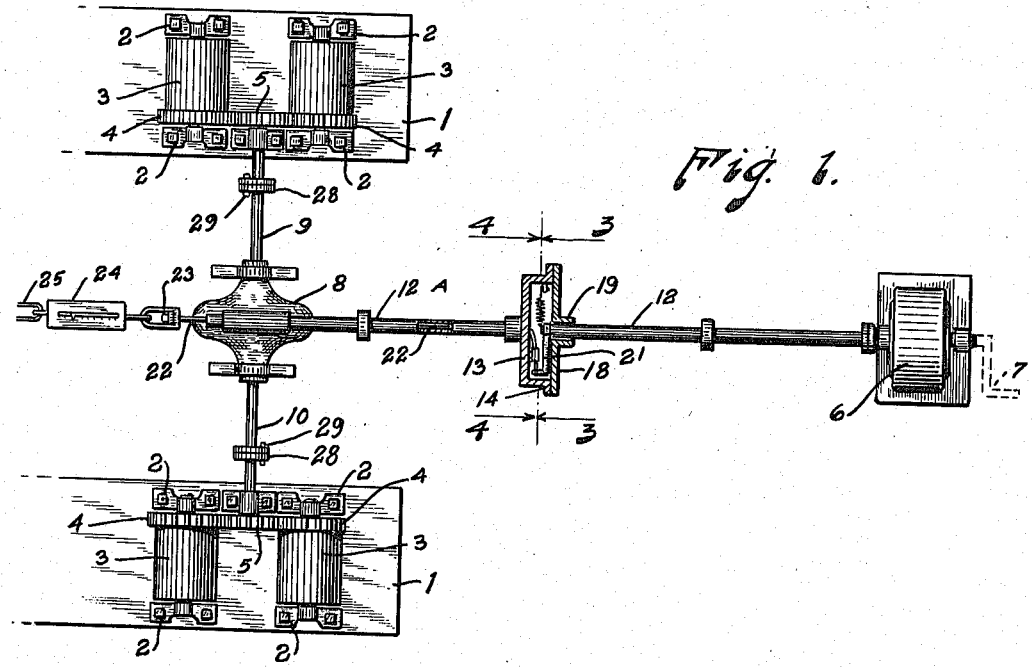
Fig. 1 is a plan view of my improved testing machine with portions thereof broken away to better disclose the construction.
Figure 2:
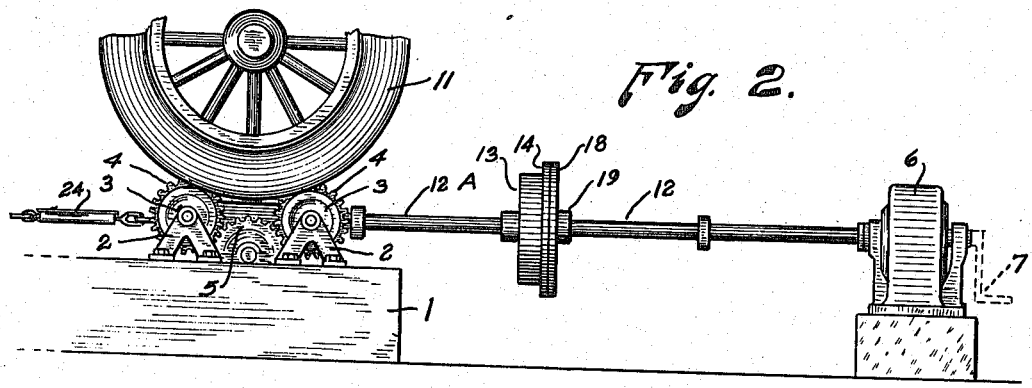
Fig. 2 is a side elevation of my machine, a portion of an automobile wheel being shown in place on one pair of rollers.
Figures 3, 4:
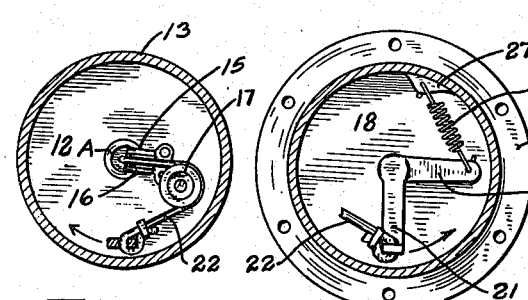
Fig. 3 is a section taken on line 3—3, Fig. 1.
Fig. 4 is a section taken on line 4—4, Fig. 1.

Numeral 1 designates foundation blocks or supports to the upper surface of which are fastened pillow blocks or bearings 2 in which are journaled the rollers 3. Each roller has secured to one end thereof a gear wheel 4 which meshes with an intermediate driving pinion 5. Power for rotating the drive pinions 5 is derived from a motor 6, which may be an electric motor, as shown on the drawing, or a gas engine. If it should be necessary or desirable, power may be imparted by means of a crank 7, shown dotted in Figs. 1 and 2. The power derived from the motor is transmitted by means of suitable shafting, which will be hereinafter described in detail, to a worm drive differential 8, from which shafts 9 and 10 extend to and connect with the pinions 5. It is evident that by operating the motor, the pinions 5 will be rotated in the same manner in which an automobile motor rotates the rear wheels. When the pinions 5 are rotated, they will, of course, rotate the rollers 3, which, in turn, will cause the rear wheels 11 of the automobile to rotate. If it were merely a question of rotating the rear wheels of an automobile by an external source of power, the above described mechanism would be sufficient. It is, however, desirable to compare the amount of power required to rotate the rear wheels under different conditions. It is, of course, possible where an electric motor is employed for the source of power to measure the current input, which, with a given voltage, gives the watts of energy consumed and thereby furnishes a measure of the power required to operate the device. It is my intention to so construct my machine that it can be operated by hand or by a gas engine and to provide means for comparing the power exerted under different conditions where so operated. In order to measure and compare the torque in the driving shaft 12, the latter is formed in two sections 12 and 12^A. Section 12^A is tubular for a purpose, which will hereinafter appear. Secured to one end of section 12^A is a casing 13 having an outwardly extending flange 14. Fastened to the inner side of the casing 13 is a bracket 15 in which is pivotally supported a pulley 16. A second pulley 17 is pivotally secured to the inside of casing 13, all as shown in Fig. 3. To the flange 14 I secure a cover 18 having a hub 19, which serves as a bearing for one end of shaft section 12, which is free to rotate therein. To the end of the shaft 12, within the casing 13, I secure a bell crank lever having arms 20 and 21. Arm 21 has an eyelet at its end and to this the flexible steel cable 22 is attached. This cable passes around pulleys 16 and 17 and extends through the hollow shaft 12^A, terminating in a ball-bearing swivel 23, the other part of which is connected to a spring scale 24 that is anchored at 25. A spring 26 extends from the end of arm 20 to a suitable lug 27 on the side of casing 13. The function of this spring is to maintain some tension in cable 22 so as to prevent it from jumping off the pulleys. As shaft 12 is rotated in the direction indicated by the arrows in Figs. 3 and 4, the arm 21 tends to pull the cable 22 around pulleys 16 and 17. Since the end of the cable is anchored to the scale 24, the cable can move only a short distance or until the tension is sufficient to rotate shaft 12^A. This tension will be indicated in pounds on scale 24. If it is desired to compute the actual power that is required to operate the machine, this can be readily done by observing the speed, the tension in the cable and calculating the length of the resultant radius on which the tension is applied. With this data, anyone versed in this art can readily calculate the actual power transmitted. I am aware that other and specifically different means may be employed for indicating the torque and for determining the power, and the above is described merely as an example. Shafts 9 and 10 are preferably made in two sections, which are connected by flange couplings 28 that are connected by bolts 29. Either set of rollers may be made idle by disconnecting the coupling 28 and clamping the shaft against rotation by some suitable braking means as will be necessary if an ordinary differential is used. Although I prefer to employ an ordinary differential at 8, this is not absolutely necessary, as shaft sections marked 9 and 10 may form one continuous shaft driven from 12^A by means of an ordinary worm gear drive, and in this case, either coupling 28 may be made inoperative without making it necessary to clamp the shaft.

I have shown the scale 24 on the opposite side of the differential from that occupied by the motor, but it is evident that by the simple expedient of employing one or more pulleys, the scale may be placed at any desired location.

My machine is employed as follows:— The rear wheels 11 of an automobile are placed upon the rollers 3 in the manner indicated in Fig. 2. Power is then applied and the wheels are rotated. If the brakes are now applied gradually, their resistance offered to rotation can be measured and compared. If one side is adjusted differently from the other, this will become apparent as one wheel will stop and the other will continue rotating. This, of course, will happen only if an ordinary differential is employed at 8. If shafts 9 and 10 are continuous, in the manner above explained, then it will be necessary, for the purpose of comparing the effectiveness of the brakes on the two sides, to alternately disconnect the flange couplings 28 so that each wheel can be adjusted independently.

It is, however, evident that a power measuring device similar to that which is incorporated in the drive shaft, can also be incorporated in each of shafts 9 and 10. If this is done, the dynamometer in the drive shaft could be dispensed with. By having power measuring devices in the shafts 9 and 10, the resistance offered to rotation by each wheel can be measured and compared so as to enable the brakes to be equally adjusted.

Where a very simple and inexpensive arrangement for rotating the rear wheels of a car is desired and where it is not necessary to measure the resistance in the manner above described, a very simple device can be constructed by means of two rollers about twelve (12) feet long and mounted on parallel axes spaced about thirty (30) inches apart. The rear wheels of one car could then be placed on the rollers in the manner shown in Fig. 2 and used for driving the same, and the rear wheels of the car to be tested could also be placed upon the same rollers and rotated thereby.

In garages my device may be employed for starting cars, especially after the motors have been overhauled, and by placing the front wheels onto the rollers instead of the rear wheels, my machine may be used for testing speedometers. For convenience in running the car wheels onto the rollers, I may provide suitable inclines, which I have not shown.

From the above, it is evident that I have produced a machine that is particularly well adapted for testing brakes and which can also be employed for other purposes in the manner described.

Having now described my invention, what I claim as new is:

1. A testing machine for automobiles comprising in combination two pairs of aligned parallel rollers, each pair adapted to support an automobile wheel and to rotate the same, a source of power, means connecting said source of power to the rollers for the purpose of rotating the same in the same direction, a dynamometer in the driving connection between the source of power and the rollers and means for detachably connecting either one of the pairs of rollers to the source of power independently of the other.

2. A testing machine for automobiles comprising in combination two pairs of aligned parallel rollers, each pair adapted to support an automobile wheel and to rotate the same, a source of power, means connecting said source of power to the rollers for the purpose of rotating the same in the same direction, a dynamometer in the driving connection between the source of power and the rollers, and means for disconnecting either pair of rollers from the source of power and means for detachably connecting either one of the pairs of rollers to the source of power independently of the other.

3. A brake-testing machine comprising in combination two pairs of rollers, the rollers of each pair being parallel and in substantial alignment with the corresponding rollers of the other pair, each roller having a gear wheel attached to one end thereof, a pinion located between the gear wheels and meshing with them, means for rotating said pinion, said means comprising a source of power, a dynamometer between said source of power and the rollers, whereby the amount of power required to rotate the rollers under different conditions may be compared and means for detachably connecting either set of rollers from the power.

4. A brake-testing machine comprising in combination two pairs of rollers, the rollers of each pair being parallel and in substantial alignment with the corresponding rollers of the other pair, each roller having a gear wheel attached to one end thereof, a pinion located between the gear wheels of each pair and meshing with them, a source of power, a differential gear mechanism between said source of power and the pinions, and means for measuring the power required to rotate the rollers.

5. A brake-testing machine comprising in combination two pairs of rollers, the rollers of each pair being parallel and in substantial alignment with the corresponding rollers of the other pair, each roller having a gear wheel attached to one end thereof, a pinion located between the gear wheels of each pair and meshing with them, a source of power, a differential gear mechanism between said source of power and the pinions, means for measuring the power required to rotate the rollers, said means comprising a shaft formed in two sections, a casing secured to the end of one section, a cover secured to said casing, said cover having a bearing for the end of the other shaft section, a flexible connection within the casing for transmitting power from one section to the other, and means for measuring the tension in said flexible connecting member.

6. A brake-testing machine comprising in combination two pairs of rollers, the rollers of each pair being parallel and in substantial alignment with the corresponding rollers of the other pair, each roller having a gear wheel attached to one end thereof, a pinion located between the gear wheels of each pair and meshing with them, a source of power, a differential gear mechanism between said source of power and the pinions, means for measuring the power required to rotate the rollers, said means comprising a shaft formed in two sections, a casing secured to the end of one section, a cover secured to said casing, said cover having a bearing for the end of the other shaft section, a flexible connection within the casing for transmitting power from one section to the other, and means for measuring the tension in said flexible connecting member, said measuring means comprising a scale.

In testimony whereof I affix my signature.

PAUL J. DONAVAN.